J. B. Pawley,
Treadle.
Nº 82,545.      Patented Sep. 29, 1868.
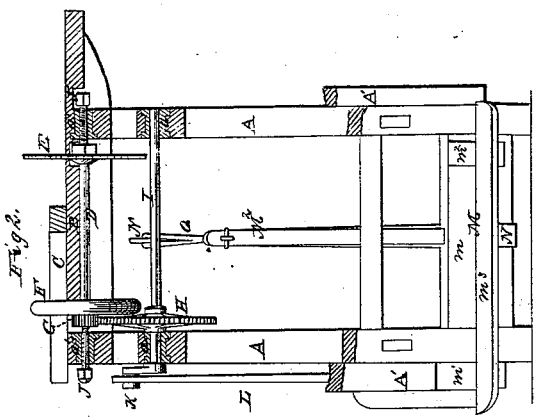
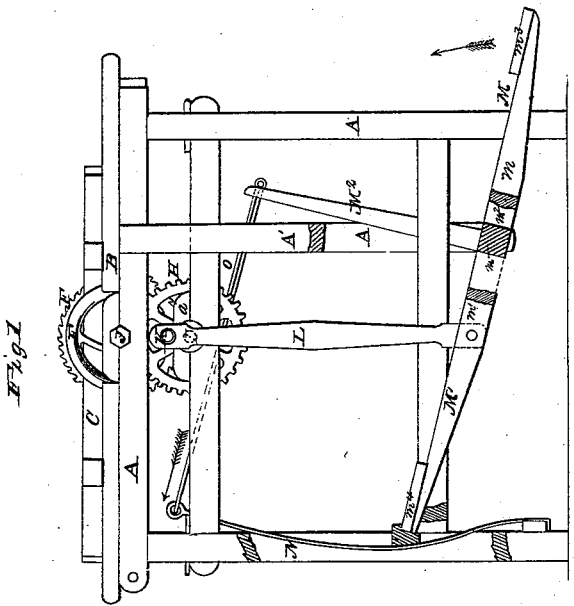
Witnesses            Inventor,

UNITED STATES PATENT OFFICE.

JASON B. PAULEY, OF TISKILWA, ILLINOIS, ASSIGNOR TO HIMSELF AND FRANKLIN B. IVES.

IMPROVEMENT IN TREAD-POWER MACHINES.

Specification forming part of Letters Patent No. 82,545, dated September 29, 1868.

*To all whom it may concern:*

Be it known that I, JASON B. PAULEY, of Tiskilwa, in the county of Bureau and State of Illinois, have invented a new and Improved Tread-Power for Driving Machinery; and the following is declared to be a full, clear, and exact description thereof, reference being had to the accompanying drawing, which is made a part of this specification.

My invention relates, primarily, to circular sawing machines, but is applicable, with similar effect, to scroll and other forms of sawing machines for light work, lathes of various kinds, sewing-machines, &c.

It consists in the provision of a suitable spring to perform the upward and otherwise "dead" or ineffective movement of the treadle, and in a simple arrangement for applying said spring in the most effective manner.

In the drawing, Figure 1 represents a side elevation of a circular sawing machine embodying my improvements, certain portions being broken away to more clearly show its construction; and Fig. 2 is a front view thereof, partly in vertical section.

A may represent the frame, B the top or "table," and C the customary adjustable gage. D is a horizontal shaft, mounted transversely of the frame at its upper edge, and carrying the saw E, a suitable fly-wheel, F, and a pinion, G, which latter is meshed by a spur-wheel, H, of increased diameter, on a parallel shaft, I, below or in other convenient position relatively to the shaft D, and preferably mounted in the customary bearings $a\ a$.

The ends of the shaft D are countersunk, and are supported on centers J, consisting of set-screws having points of suitable form, and working in internally-threaded boxes $a'$ secured in the frame at its upper edge, as shown in Fig. 2.

The shaft I is provided with a crank, K, which is connected, by means of a rod, L, to a rearwardly-projecting arm, $M^1$, of the treadle M, at a suitable distance from its fulcrum $m$ to obtain the requisite motion and power.

$A'\ A'$ are "hangers" attached to the side of the frame, and projecting down to a convenient point to form bearings for the treadle, which is journaled therein, as shown in Fig. 1.

The treadle may be of any suitable form, a convenient and preferred construction being shown, which consists of a rock-shaft or fulcrum, $m$, having secured to it, near its ends, two longitudinal pieces, $m^1\ m^2$, of different length, which terminate evenly in front, and are provided with a foot-board, $m^3$, extending the entire width of the machine.

The piece $m^1$ forms the rearwardly-projecting arm $M^1$, which, terminating near the rear end of the machine, is provided with a supplemental foot-board, $m^4$, to adapt the mechanism to be operated by the workmen when at that end.

N represents a spring, of steel or other suitable material, and preferably of "straight" form, which is secured at its lower end in any suitable manner at the rear end of the machine, and connected at its upper end by a cord, O, or other suitable connection, to an upwardly-projecting arm, $M^2$, of the treadle M.

The spring N should be of sufficient strength to drive the machine in which used, and, when desirable, may be made of two or more leaves, or of other approved stronger construction, the connection O being also elastic when preferred.

The operation of the machine is as follows: The machine being at rest and the treadle in its most elevated position, the operator presses with his foot on it until it reaches its lowest position, when the crank will be just passing its upper center, as shown in Fig. 1. From this point in the ordinary construction the momentum of the machinery has not only to carry it, but also to elevate the treadle for another movement. In my arrangement the downward movement of the treadle, in addition to its ordinary work, bends forward the spring N a distance corresponding with its stroke, and, on being released, said spring immediately elevates the treadle, as indicated by the arrows in Fig. 1, to the position from which moved, when it is again depressed, and so on, imparting a smooth and regular motion to the machinery. By thus making both movements of the treadle effective a double amount of power may readily be produced with the same expenditure on the part of the operator, the force required to bend the spring being compensated for by the length of the treadle.

Having thus described my invention, I claim as new therein and desire to secure by Letters Patent—

The combined arrangement of the treadle M, arm M², connection O, spring N, and shaft I, substantially as and for the purpose described.

JASON B. PAULEY.

Witnesses:
JOHN H. WELSH,
JAMES M. GARDNER.